Patented Mar. 25, 1952

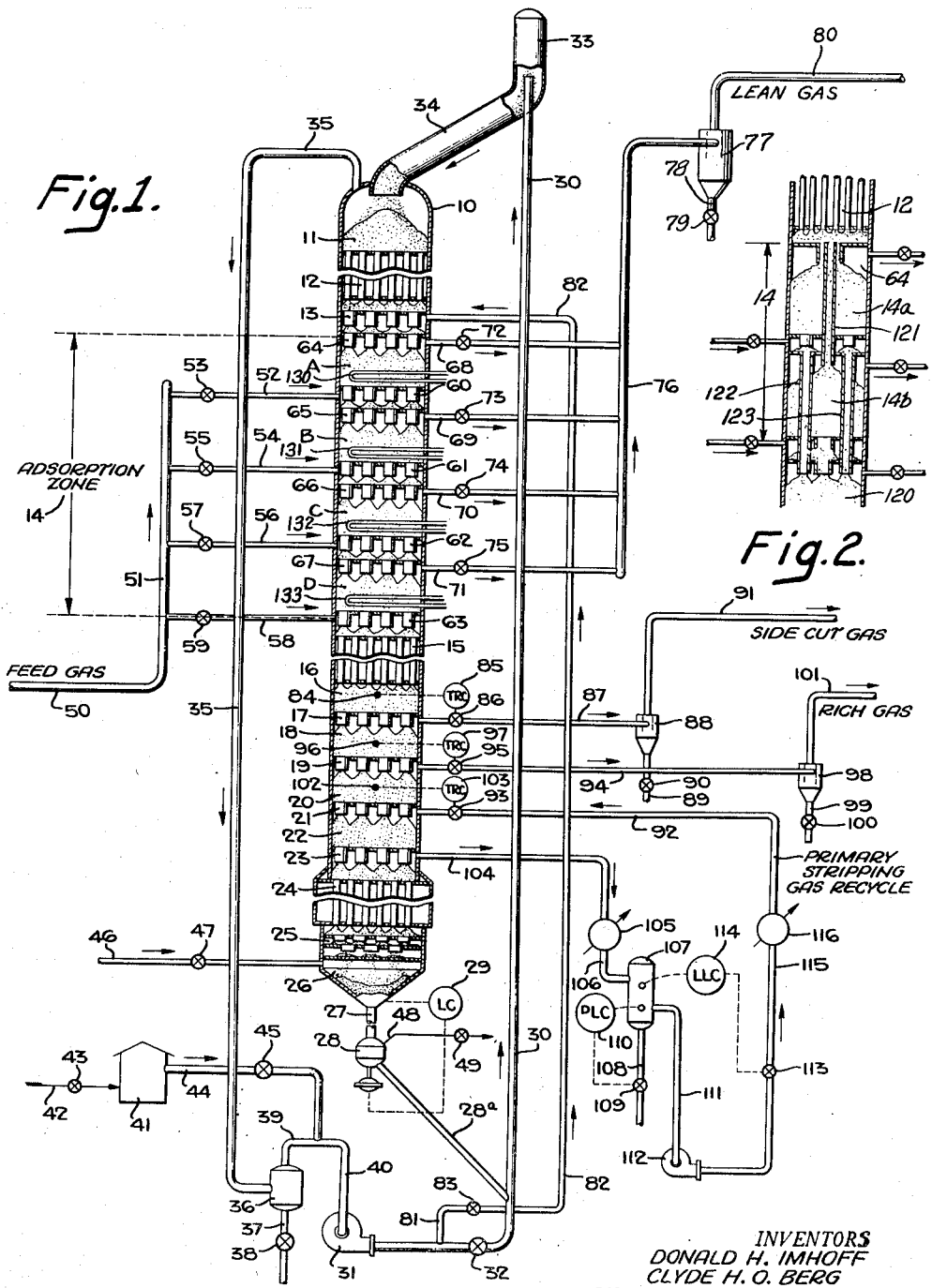

2,590,322

UNITED STATES PATENT OFFICE 2,590,322

ADSORPTION PROCESS

Donald H. Imhoff and Clyde H. O. Berg, Long Beach, Calif., assignors to Union Oil Company of California, Los Angeles, Calif., a corporation of California Application December 13, 1947, Serial No. 791,577

29 Claims. (Cl. 183—4.2)

This invention relates to the separation of gaseous mixtures by continuous selective adsorption on solid granular adsorbents and is particularly directed to the separation of mixtures containing gaseous constituents which are valuable in the production of synthetic chemicals. This invention more specifically is directed to a process for the separation of products formed in conversion processes for the production of ethylene oxide from ethylene in which high degrees of recovery and high product purities are obtained or of other gaseous mixtures containing constituents which are thermally sensitive.

The separation of gaseous mixtures by the process of selective adsorption is based on the preferential adsorption phenomena exhibited by certain solid granular adsorbents whereby some gases are more strongly adsorbed and held than other gases. With regard to the low molecular weight hydrocarbons, those having the higher boiling point or the higher molecular weight are adsorbed in preference to those having the lower boiling point or molecular weight. In the non-hydrocarbon gases, those having the lower critical temperatures such as hydrogen and helium are substantially unadsorbed while those having higher critical temperatures such as oxygen, nitrogen, etc., are more strongly adsorbed.

The process of selective adsorption for the separation of gaseous mixtures offers distinct advantages over the conventional separation process of adsorption, extraction and distillation. In applying distillation or extraction processes to the separation of gaseous mixtures containing constituents of relatively low molecular weight, elevated pressures and low temperatures are required to effect a reasonably efficient separation in an apparatus having a reasonable number of equivalent contact stages. For example, a low temperature distillation unit preparing an overhead product of substantially pure ethylene must be operated at a pressure of about 385 pounds per square inch and with a reflux temperature of about —5° F. Pressures in the range of from 500 to 600 pounds per square inch in conjunction with reflux temperatures as low as —150° F. are required in the distillation of pure methane. Compression and refrigeration of such gaseous mixtures to permit separation by distillation or extraction are expensive operations and consequently large quantities of the gaseous mixtures containing these and other like compounds are often wasted in preference to performing expensive recovery operations.

The process of selective adsorption may be applied with particular advantage to the separation of gaseous mixtures containing ethylene which are involved in processes for the manufacture of synthetic organic chemicals. This is particularly true with reference to ethylene oxide which heretofore was prepared by oxidation of ethylene with air under moderate conditions of temperature and pressure and in the presence of a catalyst to form an oxidation effluent containing less than 10% ethylene oxide by volume. This effluent was subsequently contacted with an absorbent such as water to recover the ethylene oxide. The unreacted ethylene, often equal in quantity to that reacted, was considered unrecoverable and therefore vented to the atmosphere or otherwise lost. The recovery of ethylene from such a dilute mixture was so expensive that processing the effluent gas for its separation was not warranted. The process of selective adsorption, however, as hereinafter more fully described and illustrated, offers an efficient and economical solution to this and similar problems and specifically in the case of the production of ethylene oxide, the simultaneous recovery of unreacted ethylene permits the manufacture of ethylene oxide at a low cost heretofore unobtainable.

It is the principal object of this invention to provide a process for the separation of gaseous mixtures containing ethylene oxide and ethylene together with other gaseous constituents in which a substantially complete recovery of both ethylene and ethylene oxide may be realized.

It is an additional object of this invention to provide an improved selective adsorption process for the separation of gaseous mixtures containing constituents which readily react with or are soluble in water or which are thermally sensitive.

It is a further object of this invention to provide an improved selective adsorption process for the separation of gaseous mixtures wherein dual stripping gases are employed so that the more readily adsorbable constituents are not exposed to elevated temperatures or to a reactive stripping gas normally employed in desorbing adsorbed gases from adsorbents employed in the process.

It is also an object of this invention to provide a process of selective adsorption wherein the heat of adsorption liberated in the adsorption zone is dissipated in an auxiliary or secondary cooling zone prior to the desorption of adsorbed constituents in the desorption zone.

It is an additional object of this invention to provide an apparatus adapted to accomplish the above mentioned objects.

Other objects and advantages of this invention will become apparent to those skilled in the art as the description thereof proceeds.

Briefly, the present invention comprises a selective adsorption process wherein a gaseous mixture containing constituents of varying degrees of adsorbability is contacted with a moving bed of a solid granular adsorbent to adsorb at least one of the more readily adsorbable constituents. Provision is made for dissipating the heat of adsorption thus preventing undue temperature rises in the adsorbent bed and eliminating loss of part of the desired constituents through such reactions as thermal decomposition or polymerization, or the like. The rich adsorbent, containing adsorbed constituents present in the gaseous mixture to be separated, is subsequently contacted with a primary stripping gas containing a constituent not necessarily present in the gaseous mixture but which is more readily adsorbable than the more readily adsorbable constituents of the gaseous mixture. A preferential desorption of these constituents is effected at reduced temperatures to form an adsorbent which is substantially free of the desired constituents adsorbed from the gaseous mixture and which is substantially completely saturated with the more readily adsorbable constituent or constituents employed as the primary stripping gas. The primary stripping gas is subsequently stripped or desorbed from the adsorbent by subjecting the adsorbent to indirect heating and the action of a secondary stripping gas such as steam to form a lean adsorbent. The lean adsorbent thus formed is subsequently recycled and employed to contact further quantities of the gaseous mixture to be separated.

This process as above described is accomplished in an apparatus which comprises a vertical adsorption column through which is maintained a continuous downward flow of solid granular adsorbent as a moving bed. This moving bed flows by gravity successively through zones of primary cooling, adsorption, secondary cooling, rectification and desorption as hereinafter more fully described.

The process and apparatus of this invention may be more clearly understood and described by reference to the accompanying figures in which:

Figure 1 is a schematic flow diagram of the apparatus adapted to carry out the process of this invention in which a vertical cross section of a selective adsorption column is shown, and Figure 2 shows a modified system of adsorption zones.

For purposes of illustration it will be assumed that the gaseous mixture to be separated comprises air, carbon dioxide, water vapor, ethylene and ethylene oxide. The ethylene and ethylene oxide are the more readily adsorbable constituents and the constituents which are desired to be separated from the gaseous mixture as separate streams and in substantially pure form. The solid granular adsorbent will be considered to be activated coconut charcoal.

Selective adsorption column 10 is provided at successively lower levels with charcoal hopper 11, primary cooling zone 12, drying gas engaging zone 13, adsorption zone 14 which is made up of a plurality of individual adsorption zones as hereinafter more fully described, secondary cooling zone 15, primary rectification zone 16, side cut gas disengaging zone 17, secondary rectification zone 18, rich gas disengaging zone 19, primary stripping zone 20, primary stripping gas engaging zone 21, isolation zone 22, stripping gas disengaging zone 23, adsorbent heating zone 24, adsorbent feeder zone 25, and bottom zone 26. Adsorption zone 14 is shown in the drawing as comprising a series of four individual unit adsorption zones operating in parallel with respect to the gaseous mixture to be separated in that about one-quarter of the gaseous mixture is passed through each adsorption zone. It is not necessary to the successful operation of the process that four or any other number of unit adsorption zones be employed, and the number employed in any given apparatus is dictated solely by the quantity of gaseous mixture to be separated per unit of time. The quantity of gas passed through the selective adsorption apparatus determines the diameter, and since there is a maximum permissible gas velocity through the adsorption zone, this gas velocity together with a consideration of a practical tower diameter, determines the number of unit adsorption zones employed.

The solid granular adsorbent, which is in this case coconut charcoal, is passed downwardly continuously through the aforementioned zones from charcoal hopper 11 to bottom zone 26 wherein the charcoal collects. The charcoal present at this point in the selective adsorption apparatus is at an elevated temperature and is substantially free of adsorbed constituents. It is removed from bottom zone 26 by means of sealing leg 27 and is pased into charcoal flow rate control valve 28 operated in conjunction with level controller 29 to maintain sealing leg 27 full of adsorbent charcoal. The charcoal subsequently passes from valve 28 downwardly through transfer line 28a and is introduced into lift line 30 wherein it contacts an upwardly flowing stream of gas forming a charcoal-lift gas suspension. Under pressure exerted by lift gas blower 31 controlled by valve 32 the charcoal suspension is passed upwardly through lift line 30 and is introduced into impactless separator 33 wherein the lift gas suspension is broken. The lift gas and the charcoal flow as substantially independent phases downwardly from impactless separator 33 through transfer line 34 and collects in charcoal hopper 11. The lift gas containing small quantities of charcoal fines formed by attrition of the charcoal adsorbent are removed from the upper part of selective adsorption column 10 through lift gas return line 35 by means of which it is introduced into separator 36. Within separator 36 suspended charcoal fines are separated and collected in the bottom thereof from which they are removed by means of line 37 controlled by valve 38. The adsorbent-free lift gas is removed from separator 36 by means of line 39 and is combined with further quantities of a lift gas make-up and passed by means of line 40 into the suction inlet of lift gas blower 31 to be re-employed in the charcoal lift line. It is very often desirable to employ as the lift gas a gas which is chemically inert and for this reason inert gas generator 41 is provided to generate such an inert gas. Air and natural gas are introduced by means of line 42 controlled by valve 43 in carefully controlled quantities into inert gas generator 41. The inert gas thus formed is passed by means of line 44 controlled by valve 45 into line 38 wherein it is mixed with the inert lift gas circulating in the system.

A portion of the lift gas employed in the process passes upwardly from lift line 30 through transfer line 28a countercurrent to the downwardly flowing charcoal. In addition a small quantity of the steam introduced into bottom zone 26 through line 46 controlled by valve 47 passes downwardly through sealing leg 27 concurrent with the charcoal. In order to avoid contamination of the lift line gas with stripping steam or the rich gas product with constituents employed in the lift gas, a seal gas is removed from charcoal flow control valve 28 by means of line 48 controlled by valve 49. This seal gas consists of a mixture of stripping steam and lift gas and effectively prevents the passage of steam into the lift gas cycle as well as the introduction of lift gas into the lower portion of selective adsorption apparatus.

A gaseous mixture containing nitrogen, oxygen, water vapor, carbon dioxide, ethylene and ethylene oxide is introduced at a moderate pressure into adsorption zone 14 by means of line 50. In the present modification, adsorption zone 14 consists of four unit adsorption zones A, B, C, and D, the feed gas is passed by means of line 50 into feed gas manifold 51 wherefrom four portions of feed gas are removed to be introduced into each of the four unit adsorption zones. That portion of feed gas entering unit adsorption zone A is passed thereinto by means of line 52 controlled by valve 53, the portion entering adsorption zone B by means of line 54 controlled by valve 55, that portion entering adsorption zone C by means of line 56 controlled by valve 57 and that portion entering adsorption zone D by means of line 58 controlled by valve 59. The feed gas entering unit adsorption zone A is introduced by means of feed gas engaging zone 60 and passes upwardly countercurrent to a downwardly moving bed of coconut charcoal, the feed gas introduced into unit adsorption zones B, C and D are introduced by means of feed gas engaging zones 61, 62 and 63, respectively. Within each of the unit adsorption zones above mentioned, a preferential adsorption of ethylene and ethylene oxide is effected to form a rich charcoal leaving a lean gas containing oxygen, nitrogen and carbon dioxide substantially unadsorbed. The lean gas thus formed passes upwardly to the top of each of the unit adsorption zones to be removed therefrom by means of lean gas disengaging zones 64, 65, 66, and 67, respectively. This lean gas is removed from each of the aforementioned disengaging zones by means of lines 68, 69, 70 and 71 controlled respectively by valves 72, 73, 74 and 75. The lean gas fractions thus removed are combined in lean gas product manifold 76 which introduces the gaseous mixture into separator 77. Herein suspended traces of the charcoal adsorbent are separated from the lean gas and removed from separator 77 by means of line 78 controlled by valve 79. A solid-free lean gas product is removed from separator 77 by means of line 80 and contains nitrogen, oxygen and carbon dioxide and is substantially free of ethylene and ethylene oxide.

The engaging and disengaging zones previously referred to in connection with the introduction and removal of gases to and from the unit adsorption zones consist of a tray or plate disposed perpendicular to the vertical axis of selective adsorption column and fills the entire cross sectional area. The tray is provided with short tubes extending downward therefrom so that the downwardly flowing charcoal rests on the upper surface of the tray and passes downwardly through the tubes attached to the tray. Such a construction forms a free gas space below the tray and between the tubes which is well adapted to the introduction and removal of gases to and from the column. Since, for example, engaging tray 60 of unit adsorption zone A is above and adjacent to disengaging tray 65 of unit adsorption zone B, there would ordinarily be a strong tendency for the feed gas introduced into engaging zone 60 to flow downwardly directly to disengaging tray 65. Such an occurrence is substantially eliminated by employing large diameter tubes in the engaging trays and small diameter tubes in the disengaging trays so that the pressure drops existing between the engaging tray of one unit adsorption zone and the disengaging tray of the same adsorption zone is only a small fraction of the pressure drop existing for an equivalent flow of gas between the engaging tray of one unit adsorption zone and the disengaging tray of the unit adsorption zone immediately below.

The charcoal introduced into adsorption zone 14 passes downwardly from hopper 11 through cooling zone 12 wherein it is cooled by indirect heat exchange. The cooled lean charcoal subsequently passes downwardly through drying gas engaging zone 13. This engaging zone is provided so that a portion of the lift gas may be removed from effluent line of lift gas blower 31 by means of lines 81 and 82 controlled by valve 83. The tubes of drying gas engaging zone 13 are large in diameter compared to those of lean gas disengaging zone 64 and the larger portion of drying gas thus introduced passes upwardly through cooling zone 12 countercurrent to the downwardly flowing charcoal. In this manner traces of adsorbed water and other adsorbed constituents are removed and the charcoal introduced into the adsorption zone is cool, dry, and substantially free of adsorbed gases. It is, however, saturated with the inert gaseous constituents employed in the lift line. These constituents are, however, very much less readily adsorbable than the constituents which must be recovered from the gaseous mixture. This cool lean charcoal subsequently passes downwardly through unit adsorption zones A, B, C, and D of adsorption zone 14 wherein it contacts the gaseous mixture to be separated and becomes substantially saturated with ethylene and ethylene oxide, the more readily adsorbable constituent.

The charcoal may be divided into a plurality of at least two separate streams above adsorption zone 14, one stream being directly introduced into unit adsorption zone 14a and via tube 121 to unit adsorption zone 14b etc., independently of each other. Also the rich adsorbent formed in each unit adsorption zone may be removed therefrom, that is, directed from zone 14b and via tubes 122 and 123 from zone 14a, and conveyed independently of the other unit adsorption zones such as zone 14b to the rectification zone 120 wherein all the fractions of rich charcoal are combined. Such a modification is the most desirable for the recovery of ethylene and ethylene oxide from a dilute gaseous mixture and such a multiple tray adsorption zone comprises the preferred type of adsorption zone of this invention. Such a construction is more clearly described, illustrated, and claimed in copending application, Serial No. 730,166, filed February 21, 1947, now Patent No. 2,550,955, issued May 1, 1951, by one of the inventors of the present invention.

During the adsorption of the more readily adsorbable constituent, the heat of adsorption liberated effectively increases the temperature of the charcoal so that the rich adsorbent which is discharged from the bottom of unit adsorption zone D is at a higher temperature than the cooled lean adsorbent discharged from cooling zone 12. In the separation of gaseous mixtures containing ethylene oxide or other constituents which are thermally sensitive, it is of considerable advantage to maintain the temperature of the adsorbent well below that at which losses of this type of constituent becomes of serious magnitude. Specifically, for ethylene oxide, it is desirable to maintain the temperature of the adsorbent at a temperature of less than about 150° F., and for this reason secondary cooling zone 15 is provided to cool the rich charcoal by indirect heat exchange and thereby dissipate the heat of adsorption liberated in adsorption zone 14. Secondary cooling zone 15 cools the rich charcoal to a temperature which is about equal to that of the cool lean charcoal introduced into adsorption zone 14. The cooled rich charcoal thus formed contains adsorbed quantities of ethylene oxide and ethylene and water vapor together with smaller quantities of the less readily adsorbable constituents, oxygen, nitrogen, and carbon dioxide.

The rich charcoal, cooled in secondary cooling zone 15, passes downwardly into primary rectification zone 16 wherein it is contacted with a first reflux containing ethylene and ethylene oxide. A preferential desorption is effected whereby the less readily adsorbable constituents are substantially completely desorbed to form a partially rectified charcoal containing adsorbed ethylene oxide, ethylene and a small quantity of water vapor. The partially rectified charcoal passes downwardly into secondary rectification zone 18 wherein it is contacted with a second reflux gas containing a high percentage of ethylene oxide. A preferential desorption of adsorbed ethylene and carbon dioxide is effected and the desorbed constituents pass upwardly from secondary rectification zone 18 leaving a rectified charcoal. A portion of the thus desorbed gas is removed from side cut gas disengaging zone 17 as a substantially pure ethylene side cut gas product and the remaining portion passes upwardly through the tubes of disengaging zone 17 to enter primary rectification zone 16 to serve therein as a first reflux. The temperature effect caused by the exothermic adsorption of ethylene is employed by means of thermocouple 84 and temperature recorder controller 85 to actuate side cut gas control valve 86 to control the rate at which the ethylene product is withdrawn from side cut gas disengaging zone 17 through 87. The quantity of ethylene reflux introduced into primary rectification zone 16 is also simultaneously controlled. The side cut gas product removed by means of line 87 is introduced into separator 88 wherein suspended charcoal particles are settled. These charcoal particles are removed from separator 88 by means of line 89 controlled by valve 90 and the solid free first side cut gas product is removed by means of line 91. This first side cut gas product contains a high concentration of ethylene together with lesser amounts of carbon dioxide and ethylene oxide.

The rectified charcoal is contacted in secondary rectification zone 18 as above described with a reflux gas containing ethylene oxide to form a partially stripped charcoal which is substantially free of adsorbed ethylene and less readily adsorbable constituents. This partially stripped charcoal subsequently flows downwardly through rich gas disengaging zone 19 into primary stripping zone 20 wherein the partially stripped charcoal is contacted with a primary stripping gas containing a high concentration of one or more constituents which are more readily adsorbable on the charcoal than ethylene oxide. Such a primary stripping gas may comprise the vapor of any low boiling normally liquid hydrocarbon such as pentane, hexane, heptane, benzene, toluene, cyclopentane, cyclohexane, or mixtures of such hydrocarbons. For the instant separation of ethylene and ethylene oxide, vaporized pentane introduced into primary stripping gas engaging zone 21 by means of line 92 controlled by valve 93 serves to desorb the ethylene oxide. A portion of the gaseous pentane thus introduced passes upwardly into primary stripping zone 20 wherein a preferential adsorption of the pentane gas effectively desorbs the adsorbed ethylene oxide. The ethylene oxide thus desorbed passes upwardly into rich gas product disengaging zone 19 wherefrom a portion of the desorbed ethylene oxide is removed therefrom by means of line 94 controlled by valve 95 as a rich gas product and the remaining portion passes upwardly into secondary rectification zone 18 as reflux. The rate at which the rich gas product is removed and the rate at which reflux is introduced into secondary rectification zone 18 is controlled by means of valve 95 which is actuated by thermocouple point 96 operating in conjunction with temperature recorder controller 97. The ethylene oxide reflux exhibits a temperature effect in secondary rectification zone 18 known as a temperature break which permits close control of gas product removal rate necessary to the successful operation of the process. The ethylene oxide rich gas product removed by means of line 94 is introduced into separator 98 wherein suspended charcoal particles are separated. These charcoal particles are removed from separator 98 by means of line 99 controlled by valve 100 and the solid free rich gas product consisting of substantially pure ethylene oxide is removed from separator 98 and sent to storage or further processing facilities, not shown, by means of line 101.

Within primary stripping zone 20 a similar heat effect or temperature break is noted which is caused by the preferential desorption of ethylene oxide by pentane. By means of thermocouple 102 and temperature recorder controller 103 the quantity of pentane introduced through line 92 is controlled by valve 93 to a quantity sufficient to effect substantially complete desorption of the ethylene oxide. This control means, in conjunction with isolation zone 22, effectively prevents contamination of the rich gas product with the primary stripping gas pentane by controlling the rate at which it is introduced to a value which is only sufficient to desorb the ethylene oxide and insufficient to cause the migration of pentane upwardly through primary stripping zone 20 to a point where it would contaminate the rich gas product withdrawn from rich gas disengaging zone 19.

The charcoal flowing downwardly from primary stripping zone 20 passes through primary stripping gas engaging zone 21, through isolation zone 22, through stripping gas disengaging zone 23 into charcoal heating zone 24 wherein the charcoal is indirectly heated to an elevated temperature and contacted with a secondary stripping gas such as steam to desorb the adsorbed primary stripping gas. The steam and desorbed pentane pass upwardly through the tubes of heating zone 24 and enter stripping gas disengaging zone 23. Isolation zone 22 is provided to prevent the migration of desorbed pentane and steam upwardly into the zones above primary stripping gas engaging zone 21 since steam, the gas employed as the secondary stripping gas, is reactive with ethylene oxide at elevated temperatures. The desorbed pentane, together with steam, is removed from stripping gas disengaging zone 23 by means of line 104 and passed thereby into stripping gas cooler 105 wherein the pentane and steam are condensed by indirect heat exchange. The condensate thus formed is passed via line 106 into separator 107 wherein stratification of the pentane and water condensate is effected. The steam condensate is removed from separator 107 by means of line 108 controlled by valve 109 which in turn is actuated by differential level controller 110. The condensed pentane is removed by means of line 111 and is pumped by means of pump 112 at a rate controlled by valve 113 operating in conjunction with liquid level controller 114. The pentane is then introduced by means of line 115 into primary stripping gas vaporizer 116 wherefrom the pentane vapors pass by means of line 92 controlled as previously described by valve 93 into primary stripping zone 20.

The lean charcoal formed in heating zone 24 is hot and contains substantially no adsorbed gaseous constituents except a small quantity of adsorbed steam. The temperature is sufficiently high to prevent large quantities of steam to be adsorbed. The lean charcoal passes downwardly through charcoal feed zone 25 and enters bottoms zone 26 wherefrom it is returned to hopper 11 to be cooled and subsequently re-employed in adsorption zone 14 to separate further quantities of the feed gas.

The process and apparatus described above in conjunction with the figure has been found very effective in the recovery of ethylene and ethylene oxide from gaseous mixtures containing those contaminants. Pertinent operating pressures and temperatures as well as flow rates of the various product and stripping gas streams are more clearly described in the following example.

*Example*

A selective adsorption apparatus similar to that described above is employed to separate 925 MSCF per hour (one MSCF is equal to 1,000 standard cubic feet) of a gaseous mixture having the following composition.

| Component | Mol Per Cent |
|---|---|
| Nitrogen | 76.6 |
| Oxygen | 10.3 |
| Water vapor | 1.3 |
| Carbon dioxide | 6.2 |
| Ethylene | 2.0 |
| Ethylene oxide | 3.3 |
| Total | 99.7 |

The selective adsorption column employed to separate this gaseous mixture is 11.0 feet in diameter and stands about 130 feet high. An adsorbent circulation rate of 37 tons per hour of charcoal is employed. The gaseous mixture is compressed to a pressure of about 60 pounds per square in. gauge which is the operating pressure of the selective adsorption column. Steam is introduced as the secondary stripping gas at a rate of 2500 pounds per hour to pass countercurrent to the charcoal in the desorption zone which has been heated to a temperature of 600° F. Primary stripping gas, pentane vapor, is introduced at a rate of 1500 MSCF per day. The drying gas is passed upwardly through the cooling zone and is introduced at a rate of 75 MSCF per hour. The compositions of the product gases produced from the selective adsorption apparatus are given in the following tabulation:

| Component | Composition—Mol Per Cent | | |
|---|---|---|---|
| | Lean Gas | Side Cut Gas | Rich Gas |
| Nitrogen | 82.7 | | |
| Oxygen | 11.46 | | |
| Carbon dioxide | 5.73 | 30.5 | |
| Ethylene | 0.11 | 64.4 | 0.5 |
| Ethylene oxide | | 5.1 | 99.0 |
| Pentane | | | 0.5 |
| Total | 100.00 | 100.0 | 100.0 |
| Rate, MSCF per hour | 85.6 | 27.3 | 29.1 |

The stripping gas removed from the desorption zone on a water-free basis analyzes 99.5% by volume pentane and 0.5% by volume ethylene oxide.

This selective adsorption column recovers better than 97% by volume of ethylene oxide present in the gaseous mixture and effects a simultaneous recovery of 95% by volume of the ethylene. The ethylene oxide is employed in chemical syntheses reactions and the unreacted ethylene recovered as above described is recirculated with fresh ethylene feed to an oxidation unit for the preparation of further quantities of ethylene oxide.

Although the present process has been described and illustrated as effecting a separation between ethylene and ethylene oxide, it is also applicable to the separation of other gaseous mixtures in which at least one of the constituents is highly soluble in water, reacts with water or water vapor, is corrosive in the presence of water, water vapor, or is thermally sensitive as are easily polymerizable substances. The process above described is particularly well adapted to the separation of gaseous mixtures in which the desired constituent is present in low concentrations such as less than 20% by volume and may include such constituents as higher molecular weight olefins, diolefins such as butadiene or cyclopentadiene, the substituted acetylenes, gases such as halogens including chlorine or bromine, the halogen acids such as hydrogen chloride, and sulfur dioxide, etc.

The selective adsorption apparatus is further provided with an auxiliary stripping zone, not shown in the drawing, which subjects a small fraction of the total charcoal flow through the selective adsorption column to a high temperature steam treatment which serves to remove polymers and maintains a high adsorption capacity of the charcoal.

The charcoal employed in the above process which is the preferred modification of this invention is preferably granular, a mesh size of between about 10 and 14 being well suited although granules about as large as 4 mesh and as small as about 100 mesh or smaller may be employed in specific instances. Other charcoals other than those prepared from coconut hulls and including any animal or mineral carbon having adsorptive characteristics may be employed. Other adsorbents may be substituted if desired such as activated aluminum oxide, silica gel, or other inorganic adsorbents prepared from oxides or hydroxides such as chromium oxide, iron oxide, and the like.

A modification exists in the apparatus employed for conveying the adsorbent from the bottom to the top of the selective adsorption column. The lift line may be substituted, if desired, with a bucket elevator. This mode of charcoal or other adsorbent conveyance is not particularly desirable at high pressures of operation because of the difficulties involved in driving the elevator mechanism through high pressure seals.

The preferred modification of this invention has been described as operating at a pressure of about 60 pounds per square inch gauge. However, this should not be taken as a limitation of this invention since the process herein described may, if desired, be carried out at pressures within the range of from atmospheric pressure or below to as high as 1,000 pounds per square inch or higher, depending upon the gaseous mixture to be separated and other operational considerations.

The secondary cooling zone, shown immediately below the adsorption zone may be divided into a number of cooling zones placed near the bottom of each unit adsorption zone such as cooling coils 130, 131, 132 and 133 shown in Figure 1. Such a modification is particularly advantageous when one single stream of adsorbent flows through all the unit adsorption zones and there is a possibility that the heat of adsorption will cause undue adsorbent temperature increases. Where the preferred multiple adsorption zones are employed, each having a separate stream of granular adsorbent, one secondary cooling zone is adequate.

Having described and illustrated this invention and realizing that many modifications thereof may occur to those skilled in the art without departing from the spirit and scope of the following claims, we claim:

1. A process for the separation of gaseous mixtures which comprises contacting said gaseous mixtures with a moving bed of lean granular adsorbent to adsorb the more readily adsorbable constituents forming a rich adsorbent and leaving less readily adsorbable constituents as a substantially unadsorbed lean gas separating said lean gas from said adsorbent, contacting said rich adsorbent with a primary stripping gas to preferentially desorb said more readily adsorbable constituents as a rich gas leaving a partially stripped adsorbent containing adsorbed primary stripping gas, separating said rich gas from said adsorbent, desorbing said primary stripping gas by heating said partially stripped adsorbent in the presence of a secondary stripping gas and separating the thus desorbed primary stripping gas from said adsorbent.

2. A process for the separation of gaseous mixtures which comprises passing said gaseous mixtures through an adsorption zone to contact a moving bed of solid granular adsorbent forming a rich adsorbent containing adsorbed more readily adsorbable constituents and leaving a substantially unadsorbed lean gas, removing said lean gas from said adsorption zone as a lean gas product, passing said rich adsorbent to a desorption zone, contacting said rich adsorbent therein with a primary stripping gas thereby preferentially desorbing said more readily adsorbable constituents as a rich gas leaving a partially stripped adsorbent, removing the thus desorbed rich gas as a rich gas product from said desorption zone, subjecting said partially stripped adsorbent to indirect heating in the presence of a secondary stripping gas thereby desorbing and recovering said primary stripping gas for reuse.

3. A process for the separation of gaseous mixtures which comprises contacting said gaseous mixtures with a moving bed of lean solid granular adsorbent to adsorb more readily adsorbable constituents which may be thermally sensitive to form a rich adsorbent and leaving less readily adsorbable constituents as a substantially unadsorbed lean gas, withdrawing said lean gas, cooling the rich adsorbent thus formed to dissipate the heat of adsorption, contacting the cooled rich adsorbent with a primary stripping gas to preferentially desorb said more readily adsorbable constituents at a low temperature to form a rich gas leaving a partially stripped adsorbent containing adsorbed primary stripping gas, withdrawing said rich gas, desorbing said primary stripping gas by heating said partially stripped adsorbent in the presence of a secondary stripping gas and withdrawing said stripping gases.

4. A process according to claim 3 wherein said moving bed of lean solid granular adsorbent is passed through a plurality of adsorption zones in contact with the gaseous mixture to be separated.

5. A process according to claim 4 wherein the stream of lean solid granular adsorbent is passed successively through each of said plurality of adsorption zones.

6. A process according to claim 5 in combination with the step of indirectly cooling the rich adsorbent formed in each of said plurality of adsorption zones prior to its introduction into the succeeding adsorption zone.

7. A process according to claim 4 in combination with the step of passing a separate independent stream of lean solid granular adsorbent through each of said plurality of adsorption zones and subsequently combining said separate streams following removal therefrom.

8. A process for the separation of gaseous mixtures which comprises passing said gaseous mixture through an adsorption zone in countercurrent contact with a moving bed of solid granular adsorbent to form a rich adsorbent heated by the liberated heat of adsorption and containing adsorbed more readily adsorbable constituents of said gaseous mixture and leaving a substantially unadsorbed lean gas, removing said lean gas from said adsorption zone as a lean gas product, passing said warm rich adsorbent through a cooling zone wherein said adsorbent is subjected to indirect cooling to dissipate said heat of adsorption to form a cool rich adsorbent, passing said cooled rich adsorbent to a desorption zone, contacting said rich adsorbent therein with a primary stripping gas thereby preferentially desorbing said more readily adsorbable constituents as a rich gas product leaving a partially stripped adsorbent, removing said rich gas product from said desorption zone, subjecting said partially stripped adsorbent to indirect heating in the presence of a secondary stripping gas thereby desorbing and recovering said primary stripping gas for reuse.

9. A process for the separation of gaseous mixtures which comprises countercurrently contacting said gaseous mixtures with a moving bed of solid granular adsorbent to adsorb the more readily adsorbable constituents from a rich adsorbent and leaving less readily adsorbable constituents as a substantially unadsorbed lean gas removing said lean gas, subjecting said rich adsorbent to indirect cooling to dissipate the heat of adsorption liberated during the adsorption of said more readily adsorbable constituents, subsequently contacting said rich adsorbent with a primary stripping gas to preferentially desorb said more readily adsorbable constituents as a rich gas product leaving a partially stripped adsorbent containing adsorbed primary stripping gas removing said rich gas, subjecting said partially stripped adsorbent to indirect heating while countercurrently contacting said adsorbent with a secondary stripping gas thereby desorbing and recovering said primary stripping gas for reuse leaving a lean adsorbent.

10. A process according to claim 9 wherein said solid granular adsorbent comprises activated charcoal.

11. A process for the separation of gaseous mixtures which comprises passing said gaseous mixture through an adsorption zone in countercurrent contact with a moving bed of solid granular adsorbent to form a warm rich adsorbent containing the more readily adsorbable constituents and leaving a substantially unadsorbed lean gas, removing said unadsorbed gas from said adsorption zone as a lean gas product, passing said warm rich adsorbent through a cooling zone to dissipate the heat of adsorption liberated during the adsorption of said more readily adsorbable constituents forming a cooled rich adsorbent, passing said rich adsorbent to a desorption zone, contacting said rich adsorbent therein with normally liquid hydrocarbon vapor to preferentially desorb said more readily adsorbable constituents as a rich gas leaving a partially stripped adsorbent, removing said rich gas thus desorbed from said desorption zone, subjecting said partially stripped adsorbent to indirect heating while countercurrently contacting the thus heated adsorbent with steam thereby desorbing from said adsorbent said hydrocarbon vapor and leaving a lean adsorbent.

12. A process according to claim 11 wherein said solid granular adsorbent comprises activated charcoal.

13. A process according to claim 11 wherein said normally liquid hydrocarbon vapor is the vapor of a hydrocarbon selected from the group consisting of pentane, hexane, heptane, benzene, toluene, cyclopentane, cyclohexane, and mixtures of such hydrocarbons.

14. In a process for the separation of gaseous mixtures containing adsorbable thermally sensitive constituents which comprises passing said gaseous mixture through an adsorption zone in countercurrent contact with a moving bed of solid granular adsorbent to form a warm rich adsorbent containing the more readily adsorbable constituents while leaving a substantially unadsorbed lean gas product removing said lean gas product, passing said rich adsorbent to a desorption zone wherein said more readily adsorbable constituents are desorbed as a rich gas product leaving a lean adsorbent removing said gas product, the improvement which comprises desorbing said thermally sensitive constituents by preferential desorption in said desorption zone through contact of said rich adsorbent with a primary stripping gas more readily adsorbable than the more readily adsorbable thermally sensitive constituents of said gaseous mixture prior to heating and stripping said adsorbent with a secondary stripping gas.

15. A process for the separation of gaseous mixtures which comprises passing a moving bed of granular charcoal downwardly through a primary cooling zone, an adsorption zone, a secondary cooling zone, a primary and a secondary rectification zone, and a desorption zone, introducing said gaseous mixture into said adsorption zone in countercurrent contact with a moving bed of cool lean charcoal cooled during passage through said primary cooling zone to form a rich charcoal containing the more readily adsorbable constituents and a lean gas containing the less readily adsorbable constituents, removing said lean gas from said adsorption zone as a lean gas product, passing said rich charcoal from said adsorption zone through said secondary cooling zone to dissipate the heat of adsorption and form a cooled rich charcoal, passing said cooled rich charcoal to a primary rectification zone, contacting said rich charcoal therein with a first reflux containing constituents of intermediate adsorbability thereby desorbing less readily adsorbable constituents forming a rectified charcoal, contacting said rectified charcoal in a secondary rectifiation zone with a seond reflux containing more readily adsorbable constituents thereby desorbing constituents of intermediate adsorbability, removing a portion of said last-named constituents from said secondary rectification zone as a side cut gas product and employing the remaining portion as said first reflux, subsequently contacting said charcoal with a primary stripping gas thereby preferentially desorbing at a lower temperature the more readily adsorbable constituents as a rich gas product leaving a partially stripped charcoal removing at least part of said rich gas product, subsequently subjecting said partially stripped charcoal to indirect heating and direct countercurrent contact with a secondary stripping gas thereby desorbing said primary stripping gas leaving a hot lean charcoal, removing said primary and secondary stripping gases and returning said hot lean adsorbent to said primary cooling zone.

16. A process according to claim 15 wherein said gaseous mixture contains ethylene and ethylene oxide which constituents are produced as said side cut gas product and said rich gas product respectively.

17. A process according to claim 15 wherein said primary stripping gas comprises a low boiling normally liquid hydrocarbon introduced in vapor form into said desorption zone.

18. A process according to claim 15 wherein said primary stripping gas comprises pentane vapor.

19. A process according to claim 15 wherein said secondary stripping gas comprises steam.

20. A process according to claim 15 wherein said primary stripping gas and said secondary stripping gas are removed together from said desorption zone, condensed and separated and said primary stripping gas condensate is revaporized and reintroduced into said desorption zone.

21. A process according to claim 15 wherein said adsorption zone comprises a multiplicity of unit adsorption zones through each of which a portion of said gaseous mixture is countercurrently contacted with a separate stream of a solid granular adsorbent to effect the separation of the more readily adsorbable constituents from the less readily adsorbable constituents.

22. A process according to claim 15 wherein said adsorption zone comprises a multiplicity of unit adsorption zones through each of which a portion of said gaseous mixture is countercurrently contacted by a stream of solid granular adsorbent, said stream of adsorbent being passed as a moving bed successively through said multiplicity of unit adsorption zones to effect the separation of the more readily adsorbable constituents from the less readily adsorbable constituents and wherein said secondary cooling zone is substituted by an indirect adsorbent cooler in each of said adsorption zones.

23. A process according to claim 15 wherein said adsorption zone comprises a multiplicity of unit adsorption zones through each of which a portion of said gaseous mixture is countercurrently contacted by a stream of solid granular adsorbent, said stream of adsorbent being divided and passed as separate independent moving beds one through each of said multiplicity of adsorption zones to effect the separation of the more readily adsorbable constituents from the less readily adsorbable constituents.

24. In a process for the separation of gaseous mixtures containing adsorbable normally gaseous constituents which are thermally sensitive or adversely effected by water which comprises countercurrently contacting said gaseous mixtures with a moving bed of solid granular adsorbent to adsorb the more readily adsorbable constituents to form a warm rich adsorbent while leaving less readily adsorbable constituents substantially unadsorbed as a lean gas, removing said lean gas, subsequently desorbing from said rich adsorbent the adsorbed more readily adsorbable constituents as a rich gas product and removing said rich gas product, the improvement which comprises cooling said warm rich adsorbent to dissipate the heat of adsorption, subsequently contacting said rich adsorbent with a nonaqueous primary stripping gas to desorb preferentially said more readily adsorbable constituents leaving a partially stripped adsorbent, removing the thus desorbed constituents, stripping said partially stripped adsorbent with a secondary stripping gas leaving a lean adsorbent, removing desorbed primary stripping gas, and employing said lean adsorbent to contact further quantities of said gaseous mixtures.

25. An apparatus for the separation of gaseous mixtures which comprises a vertical selective adsorption column, conveyance means for maintaining a continuous flow of a solid granular adsorbent from the bottom to the top of said column and subsequently by gravity as a moving bed downwardly through the zones of said adsorption column, an adsorption zone for contacting said gaseous mixture with a moving bed of said adsorbent, a secondary cooling zone for cooling the rich adsorbent formed in said adsorption zone, a desorption zone for desorbing the adsorbed constituents from said rich adsorbent by preferential desorption with a primary stripping gas, a heating zone for heating said lean adsorbent and recovering said primary stripping gas therefrom with the aid of a secondary stripping gas, means for removing said primary stripping gas and said secondary stripping gas from said desorption zone a primary cooling zone for cooling adsorbent heated in said desorption zone and means for separating said primary stripping gas from said secondary stripping gas for reintroduction into said desorption zone.

26. An apparatus for the separation of gaseous mixtures which comprises a selective adsorption column provided at successively lower levels therein with a primary cooling zone, an adsorption zone, a plurality of rectification zones and a desorption zone which contains a heating zone, means for removing adsorbent from the bottom of said column and conveying it for introduction into the top of said column to maintain a continuous downward flow of solid granular adsorbent as a moving bed through the aforementioned zones, means for introducing said gaseous mixture into said adsorption zone, means for removing a substantially unadsorbed lean gas product from said adsorption zone, means for removing a gas product from one of said rectification zones, means for introducing a primary stripping gas into said desorption zone to desorb the more readily adsorbable constituents at a low temperature and in the absence of said secondary stripping gas, means for introducing a secondary stripping gas into said desorption zone, means for removing desorbed primary stripping gas together with secondary stripping gas from said desorption zone, means for separating said primary stripping gas from said secondary stripping gas, and means for returning said primary stripping gas to said desorption zone.

27. In an apparatus according to claim 26, the improvement which comprises providing a secondary cooling zone below said adsorption zone which is adapted to cool the warm rich adsorbent passing therethrough from said adsorption zone thereby dissipating the heat of adsorption liberated in said adsorption zone during the adsorption of the more readily adsorbable constituents of said gaseous mixtures.

28. An apparatus for the separation of gaseous mixtures which comprises a vertical adsorption column provided at successively lower levels therein with a primary cooling zone, a plurality of adsorption zones, a desorption zone and a heating zone, a conveyance for passing adsorbent from the bottom of said column to the top thereof, means for passing said adsorbent in separate independent streams one through each of said adsorption zones, an inlet conduit at the bottom and an outlet conduit at the top of each of said adsorption zones, means for combining said independent streams, a secondary cooling zone below said adsorption zones for cooling the combined streams, an inlet for primary stripping gas into said desorption zones, an outlet therefrom for rich gas product desorbed thereby, an inlet below said heating zone for a secondary stripping gas, an outlet above said heating zone for a stream of primary and secondary stripping gases, and means for maintaining the adsorbent flowing through said zones as a substantially compact moving bed.

29. An apparatus for the separation of gaseous mixtures which comprises a vertical adsorption column provided at successively lower levels therein with a primary cooling zone, a plurality of adsorption zones, a desorption zone and a heating zone, a conveyance for passing adsorbent from the bottom of said column to the top thereof, means for passing said adsorbent as one stream successively through said adsorption zones, an indirect adsorbent cooler in each of said adsorption zones, an inlet conduit at the bottom and an outlet conduit at the top of each of said adsorption zones, an inlet for primary stripping gas into said desorption zones, an outlet therefrom for rich gas product desorbed thereby, an inlet below said heating zone for a secondary stripping gas, an outlet above said heating zone for a stream of primary and secondary stripping gases, and means for maintaining the adsorbent flowing through said zones as a substantially compact moving bed.

DONALD H. IMHOFF.
CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,784,536 | Pantenburg | Dec. 9, 1930 |
| 1,825,707 | Wagner, Jr. | Oct. 6, 1931 |
| 1,872,080 | Harris | Aug. 16, 1932 |
| 2,156,341 | Langwell | May 2, 1939 |
| 2,323,524 | Downs, Jr. | July 6, 1943 |
| 2,384,311 | Kearby | Sept. 4, 1945 |